UNITED STATES PATENT OFFICE.

CONRAD SEMPER, OF PHILADELPHIA, PENNSYLVANIA, ASSIGNOR TO HARRISON BROTHERS & CO., OF SAME PLACE.

MANUFACTURE OF ALUMINOUS CAKE.

SPECIFICATION forming part of Letters Patent No. 271,371, dated January 30, 1883.

Application filed December 7, 1880. (No specimens.)

*To all whom it may concern:*

Be it known that I, CONRAD SEMPER, of Philadelphia, Pennsylvania, have invented an Improvement in the Manufacture of Aluminous Cake or Sulphate of Alumina, of which the following is a clear and exact description, and sufficient to enable those skilled in the art to which my invention appertains to fully understand and practice the same.

The object of my invention is to produce a white aluminous cake, or sulphate of alumina, from a ferruginous aluminous material—such as bauxite, alum, clay, &c.—by reducing the ferric-oxide salts in said material to ferrous-oxide salts, and at the same time neutralizing any free acid which may be present, thus producing an article well suited for paper-makers' use.

I have discovered that the addition of sulphites, bisulphites, or hyposulphites of the alkalies, alkaline earths, or metallic bases to a pasty or semi-fused mass of ferruginous sulphate of alumina reduces the peroxide of iron therein to a colorless protoxide of iron, whereby a colorless compound of alum results, which may be formed into aluminous cake or other aluminous compound in the usual manner.

I do not confine myself to any particular time at which the reducing agents above mentioned are to be added to the ferruginous aluminous sulphate; but I prefer to add said reducing sulphites, bisulphites, or hyposulphites, &c., to the semi-fused mass of the ferruginous aluminous sulphate obtained from bauxite and sulphuric acid at or about the time the reaction of the sulphuric acid upon the bauxite or other aluminous clay ceases or is about to cease. The action of the sulphites, bisulphites, or hyposulphites upon the semi-fused mass of ferruginous aluminous sulphate is such as to cause the disengagement of sulphurous acid, which combines with part of the oxygen of the peroxide of iron and forms colorless protoxide of iron and sulphuric acid, which remains in the aluminous product.

Having thus described my invention, I claim and desire to secure by Letters Patent of the United States—

The herein-described process for manufacturing a white aluminous cake from ferruginous aluminous sulphate by treating the aluminous sulphate in a semi-fused condition with sulphites, bisulphites, or hyposulphites of the alkalies, alkaline earths, or the metallic bases.

In testimony whereof I have hereunto signed my name this 1st day of December, A. D. 1880.

CONRAD SEMPER.

In presence of—
W. C. STRAWBRIDGE,
J. BONSALL TAYLOR.